United States Patent Office 3,308,136
Patented Mar. 7, 1967

3,308,136
2-SUBSTITUTED-1,4-BENZODIOXANES
Maurice Shapero, Edgware, and Peter Nicholl Green, Pinner, England, assignors to Ward Blenkinsop & Company Limited, Middlesex, England, a British company
No Drawing. Filed Aug. 31, 1964, Ser. No. 393,429
Claims priority, application Great Britain, Sept. 3, 1963, 34,778/63
9 Claims. (Cl. 260—340.3)

This invention relates to the production of pharmacologically valuable 1,4-benzodioxanes.

The present invention provides a substituted 1,4-benzodioxane having the general formula

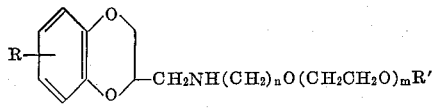

in which R is a hydrogen or halogen atom or an alkyl or alkoxy group having one to six carbon atoms, $n$ is one, two or three, $m$ is one or two and R' is an alkyl group having one to six carbon atoms.

The substituent R may be present in any of the four available positions in the benzene ring of the 1,4-benzodioxane structure.

The invention also includes the acid addition salts, such as the hydrochloride, sulphate, phosphate and acid maleate, of the said 1,4-benzodioxanes.

According to a feature of the present invention substituted 1,4-benzodioxanes having the above general formula may be prepared by reacting a 2-monosubstituted methyl 1,4-benzodioxane having the general formula

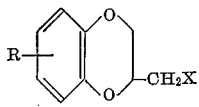

with an aliphatic ether having the general formula

Z.(CH$_2$)$_n$O.(CH$_2$CH$_2$O)$_m$R' in which formulae R, R', $n$ and $m$ are as above defined, one of X and Z is a halogen atom and the other is a primary amino group.

Thus the reaction may be between a 2-aminomethyl 1,4-benzodioxane and a halogen-substituted aliphatic ether or between a 2-halomethyl 1,4-benzodioxane and a primary aminosubstituted aliphatic ether. Both of these reactions lead to the formation of a hydrohalide of a 2-substituted 1,4-benzodioxane. This hydrohalide may be subsequently decomposed by treating the crude product with an acid acceptor. It is preferred to use an inorganic acid acceptor and to carry out the decomposition in the presence of a solvent for the base being liberated. The bases can subsequently be purified by distillation. On neutralisation with an acid the corresponding salt of the base is obtained.

The 2-aminomethyl 1,4-benzodioxanes from which the compounds of the present invention may be obtained include 2-aminomethyl 1,4-benzodioxane, 2-aminomethyl 5-chloro-1,4-benzodioxane, 2-aminomethyl 8-methyl-1,4-benzodioxane and 2-aminomethyl 8-methoxy-1,4-benzodioxane.

The halogen-substituted aliphatic ethers used in the process of the present invention employing the 2-aminomethyl 1,4-benzodioxanes have the general formula Hal.(CH$_2$)$_n$O(CH$_2$CH$_2$O)$_m$R' in which Hal is a halogen atom and $m$, $n$ and R' are as above defined. These ethers contain at least two but not more than three ethereal oxygen atoms, the latter being separated by ethylene groups. The compounds may be further defined as β-alkoxyethyl ω-haloalkyl ethers and β-alkoxyethoxyethyl ω-haloalkyl ethers in which the haloalkyl group is an ω-monohalogen methyl, ethyl or n-propyl group. The alkoxy groups have one to six carbon atoms and are preferably methoxy or ethoxy groups. The halogen is preferably a chlorine or bromine atom.

Examples of halogen-substituted aliphatic ethers which may be used include chloromethyl β-ethoxyethyl ether, bromomethyl β-ethoxy ethyl ether, iodomethyl β-methoxyethyl ether, β-chloroethyl β-(β'-ethoxyethoxy)ethyl ether, chloromethyl β-(β'-isopropoxyethoxy)ethyl ether, β-bromoethyl β-(β'-n-butoxyethoxy)ethyl ether, chloromethyl β-n-propoxy-ethyl ether and γ-n-chloropropyl β-methoxyethyl ether.

The 2-halomethyl 1,4-benzodioxanes from which the compounds of the present invention may also be obtained include 2-chloromethyl 1,4-benzodioxane, 2-bromomethyl 1,4-benzodioxane, 2-chloromethyl 5-chloro-1,4-benzodioxane, 2-chloromethyl 8-methyl-1,4-benzodioxane and 2-chloromethyl 8-methoxy-1,4-benzodioxane.

The primary amino-substituted aliphatic ethers used in the process of the present invention when employing the 2-halomethyl 1,4-benzodioxanes have the general formula NH$_2$(CH$_2$)$_n$O(CH$_2$CH$_2$O)$_m$R' in which $m$, $n$ and R' are as above defined. These ethers also contain at least two but not more than three ethereal oxygen atoms. The ethers can be further defined as β-alkoxyethyl ω-aminoalkyl ethers and β-alkoxyethoxyethyl ω-aminoalkyl ethers in which the alkoxy group contains one to six carbon atoms. Examples of such compounds include γ-amino-n-propyl β-methoxyethyl ether, β-aminoethyl β'-(β''-ethoxyethoxy)-ethyl ether and β-ethoxyethyl aminomethyl ether.

The compounds of the present invention are readily obtained as the hydrohalides when the selected reactants are heated together. No solvent is necessary but one may be used if desired. The cyclic ethers such as dioxane are suitable solvents. The reactants are conveniently employed in substantially stoichiometric proportions. The hydrohalides may be decomposed and the bases purified as indicated above.

The compounds of the present invention have muscle relaxant properties. When administered orally to rats in doses of 25 mgm. to 100 mgm. per kilogram bodyweight the compounds of the examples have produced muscular relaxation having a duration of from 2.5 to 6.5 hours. When injected intravenously into rabbits in an amount of 5 mgm. per kilogram bodyweight the compounds have produced muscular relaxation having an average duration of 40 minutes, whilst when administered subcutaneously to rabbits in an amount of 25 mgm. per kilogram bodyweight muscular relaxation has been produced having an average duration of 2 hours.

The following examples illustrate the nature of the present invention.

*Example 1*

2-aminomethyl - 1,4 - benzodioxane (17 gm.) and β-methoxyethoxy ethyl chloride (7 gm.) were heated at 160° C. for 2 hours. The reaction mixture was cooled and chloroform (30 mls.) and a solution of potassium carbonate (7 gm.) in water (20 mls.) added thereto. The chloroform layer was removed and the aqueous layer extracted twice with chloroform (10 mls. each time). The chloroform extracts were combined and dehydrated over anhydrous sodium sulphate. Filtration, followed by distillation gave 2-(β-methoxyethoxyethyl)-aminomethyl-1,4-benzodioxane (yield 7.7 gms.) as a pale yellow oil boiling at 180–186° C./11.5 mm.

The base was converted to a white hydrochloride having a melting point of 104–106° C. by the addition of alcoholic hydrogen chloride to an ether solution of the base and isolation of the salt which separated.

*Example 2*

2-aminomethyl-1,4-benzodioxane (16.5 gm.) and β-(β′-ethoxyethoxy)-ethoxyethyl chloride (9.83 gm.) were heated at 160° C., for 2 hours and the product then worked up in the manner described in Example 1. The product, 2-[β - (β′ - ethoxyethoxy)ethoxyethyl]-aminomethyl-1,4-benzodioxane (yield 5.7 gm.) was a pale yellow mobile oil boiling at 202–206° C./1 mm.

*Example 3*

2-aminomethyl-1,4-benzodioxane (18.4 gm.) and γ-(β′-methoxyethoxy)-n-propyl chloride were heated at 160° C. for 2 hours and the product then worked up in the manner described in Example 1. The product, 2-[γ-(β′-methoxyethoxy)-n-propyl]-aminomethyl-1,4 - benzodioxane (yield 8.2 gms.) was obtained as a colourless oil boiling at 180–186° C./1 mm.

The base was readily converted into a white hydrochloride having a melting point of 141–143° C. by the method described in Example 1.

*Example 4*

2-chloromethyl-1,4-benzodioxane (18.5 g.) and γ-(β′-methoxyethoxy)-n-propylamine (27 g.) were heated at 160° C. for 2 hours and the product worked up as described in Example 1. 2-[γ-(β′-methoxyethoxy)-n-propyl]aminomethyl-1,4-benzodioxane (16 g.) was obtained as a colourless oil boiling at 184–190° C./2 mm.

The hydrochloride is identical with that of the previous example.

*Example 5*

2-chloromethyl-8-methoxy-1,4-benzodioxane (21.4 g.) and γ-(β′-methoxyethoxy)-n-propylamine (27 g.) were heated at 160° C. for 2 hours and the product worked up as described in Example 1. 2-[γ-(β′-methoxyethoxy)-n-propyl]aminomethyl-8-methoxy-1,4 - benzodioxane (17.3 g.) was obtained as a colourless oil boiling at 202–208° C./2 mm.

We claim:
1. A member selected from the group consisting of a compound of the formula

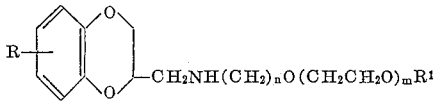

and pharmaceutically acceptable acid addition salts thereof, in which R is selected from the group consisting of hydrogen and halogen and alkyl and alkoxy having one to six carbon atoms, $R^1$ is alkyl having one to six carbon atoms, $n$ is an integer which is greater than zero but less than four and $m$ is an integer which is greater than zero but less than three.

2. A compound of the formula

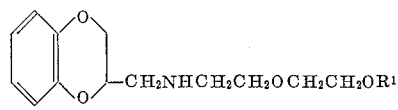

in which $R^1$ is alkyl having one to six carbon atoms.

3. A compound of the formula

in which $R^1$ is alkyl having one to six carbon atoms.

4. 2-[β-(β′ - methoxyethoxy)ethyl]aminomethyl - 1,4-benzodioxane.

5. 2-[β-(β′ - ethoxyethoxy)ethoxyethyl]aminomethyl-1,4-benzodioxane.

6. 2-[γ-(β′-methoxyethoxy) - n - propyl]aminomethyl-1,4-benzodioxane.

7. 2-[γ-(β′ - methoxyethoxy)-n-propyl]aminomethyl-8-methoxy-1,4-benzodioxane.

8. 2-[β-(β′ - methoxyethoxy)ethyl]aminomethyl - 1,4-benzodioxane hydrochloride.

9. 2-[γ-(β′-methoxyethoxy) - n - propyl]aminomethyl-1,4-benzodioxane hydrochloride.

No references cited.

ALEX MAZEL, *Primary Examiner.*

JAMES H. TURNIPSEED, *Assistant Examiner.*